(12) United States Patent
Yajima et al.

(10) Patent No.: US 7,677,776 B2
(45) Date of Patent: Mar. 16, 2010

(54) LIGHTING DEVICE FOR VEHICLE AND DOOR MIRROR DEVICE

(75) Inventors: Yasuo Yajima, Isehara (JP); Satoru Okada, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 53 days.

(21) Appl. No.: 11/926,408

(22) Filed: Oct. 29, 2007

(65) Prior Publication Data

US 2008/0259624 A1 Oct. 23, 2008

(30) Foreign Application Priority Data

Nov. 2, 2006 (JP) ............................. 2006-298598

(51) Int. Cl.
*B60Q 1/26* (2006.01)

(52) U.S. Cl. .................. 362/494; 362/249.02; 362/244; 362/245; 362/240; 362/238

(58) Field of Classification Search ................. 362/494, 362/244, 238, 240, 245, 249.02
See application file for complete search history.

(56) References Cited

U.S. PATENT DOCUMENTS

| 5,278,731 | A | 1/1994 | Davenport et al. |
| 5,490,049 | A | 2/1996 | Montalan et al. |
| 5,582,480 | A | 12/1996 | Zwick et al. |
| 6,099,153 | A * | 8/2000 | Zimmermann et al. ...... 362/494 |
| 6,170,971 | B1 | 1/2001 | Godbillon |
| 6,271,750 | B1 | 8/2001 | Bräutigam et al. |
| 6,431,738 | B1 | 8/2002 | Kondo et al. |
| 6,558,032 | B2 | 5/2003 | Kondo et al. |
| 6,637,917 | B2 * | 10/2003 | Schwanz et al. ............ 362/487 |
| 6,695,465 | B2 | 2/2004 | Apfelbeck |
| 6,758,582 | B1 | 7/2004 | Hsiao et al. |
| 6,769,798 | B2 * | 8/2004 | Mishimagi ................... 362/522 |
| 6,846,101 | B2 | 1/2005 | Coushaine |
| 7,134,772 | B2 * | 11/2006 | Furuya et al. ............... 362/494 |
| 7,513,664 | B2 | 4/2009 | Chou |
| 2002/0101734 | A1 * | 8/2002 | Tokida et al. ............... 362/245 |
| 2002/0149946 | A1 | 10/2002 | Malone et al. |

(Continued)

FOREIGN PATENT DOCUMENTS

DE   200 01 407 U1   3/2000

(Continued)

OTHER PUBLICATIONS

U.S. Appl. No. 11/905,858, filed Oct. 4, 2007, Yasuo Yajima, et al.

(Continued)

*Primary Examiner*—Jong-Suk (James) Lee
*Assistant Examiner*—Robert J May
(74) *Attorney, Agent, or Firm*—Foley & Lardner LLP

(57) ABSTRACT

A lighting device for vehicle include a housing body, an outer lens provided on the housing body, a decorating wall provided between the housing body and the outer lens and a plurality of light emitting devices which are provided between the housing body and the decorating wall and disposed with intervals to each other. The decorating wall includes a plurality of light transmitting portions, each of which is disposed to face each of the plurality of light emitting devices. The light transmitting portion is disposed to set light emitted from the corresponding light emitting device within a range of a predetermined light distribution angle.

17 Claims, 5 Drawing Sheets

U.S. PATENT DOCUMENTS

| | | |
|---|---|---|
| 2003/0169599 A1 | 9/2003 | Natsume |
| 2005/0225994 A1* | 10/2005 | Rodriguez Barros et al. .................... 362/494 |
| 2005/0254251 A1* | 11/2005 | Chou .................... 362/494 |
| 2006/0146555 A1* | 7/2006 | Inaba .................... 362/494 |
| 2007/0064435 A1 | 3/2007 | Weller et al. |

FOREIGN PATENT DOCUMENTS

| | | |
|---|---|---|
| DE | 20001407 U1 | 3/2000 |
| EP | 0 972 677 A2 | 1/2000 |
| EP | 1077344 A2 | 2/2001 |
| EP | 1304260 A1 | 4/2003 |
| EP | 1338470 A2 | 8/2003 |
| JP | 2002-79885 A | 3/2002 |

OTHER PUBLICATIONS

U.S. Appl. No. 11/872,997, filed Oct. 16, 2007, Yasuo Yajima, et al.
Yasuo Yajima et al., Office Action, U.S. Appl. No. 11/872,997, May 6, 2009, 15 pages.
Y. Yajima, U.S. PTO Office Action, U.S. Appl. No. 11/905,858, Jun. 9, 2009, 10 pages.
Y. Yajima, U.S. PTO Office Action, U.S. Appl. No. 11/905,858, dated Dec. 1, 2009, 9 pages.
Y. Yajima, U.S. PTO Notice of Allowance, U.S. Appl. No. 11/872,997, dated Dec. 14, 2009, 16 pages.

* cited by examiner

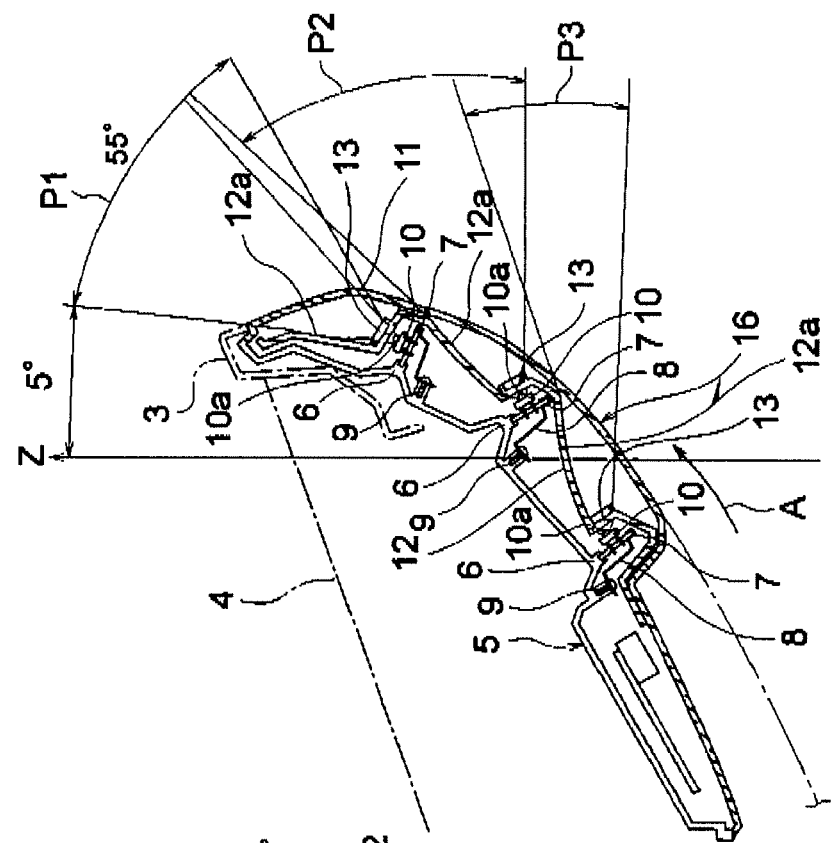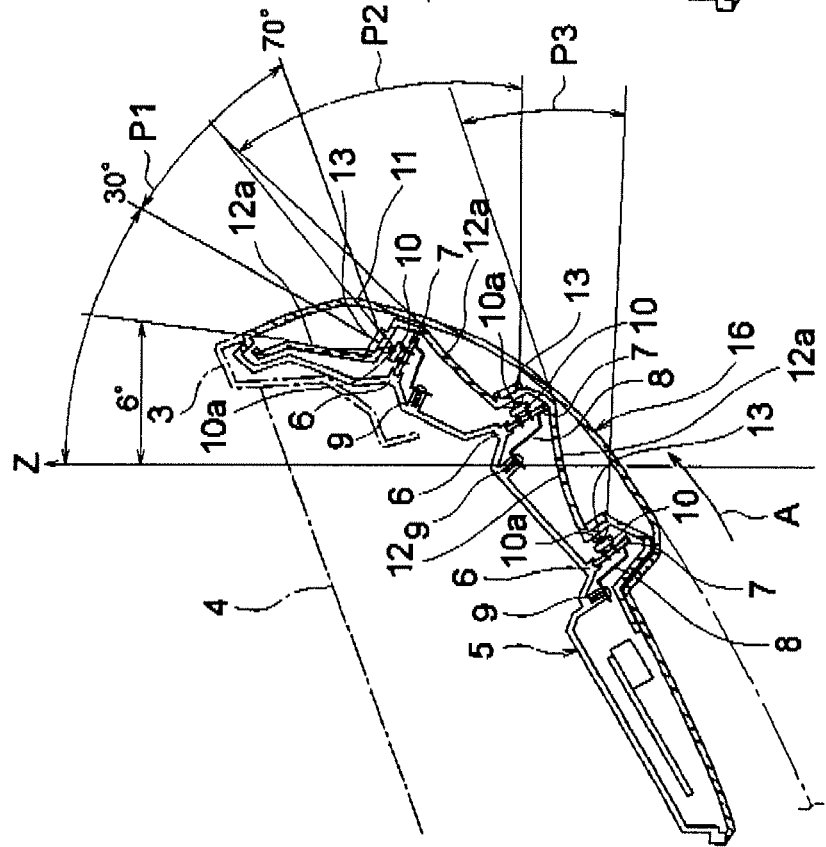

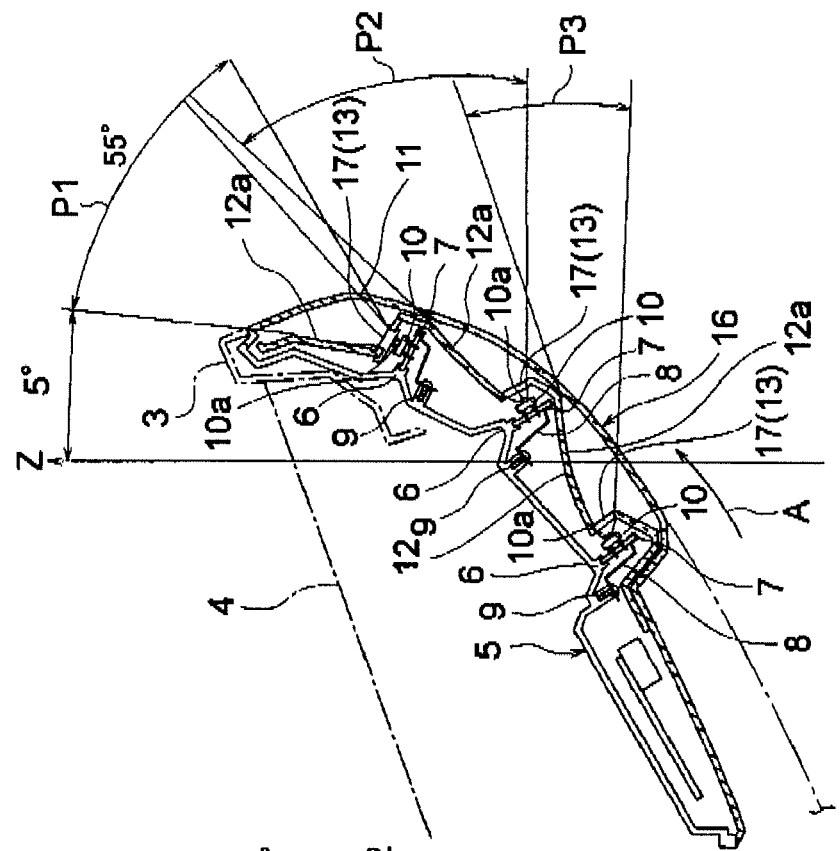
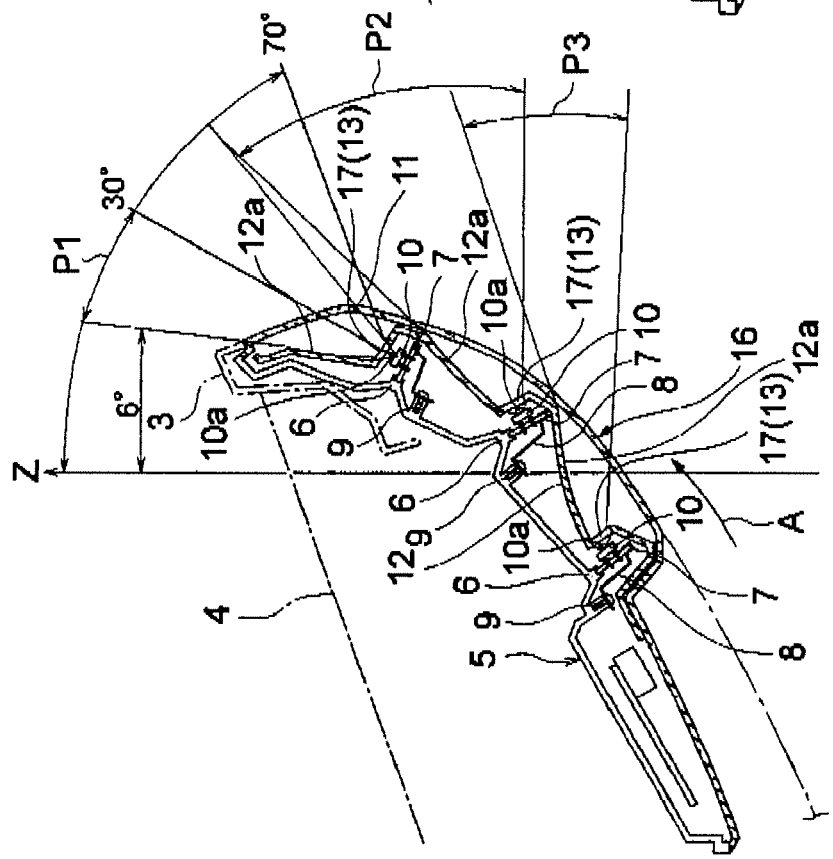

LIGHTING DEVICE FOR VEHICLE AND DOOR MIRROR DEVICE

CROSS-REFERENCE TO THE RELATED APPLICATIONS

The present application is based on and claims priority from Japanese Application Number 2006-298598, filed on Nov. 2, 2006, the disclosure of which is hereby incorporated by reference herein in its entirety.

BACKGROUND OF THE INVENTION

1. Field of the Invention

The present invention relates to a lighting device for vehicle used in an outer mirror for vehicle, particularly to a lighting device for vehicle preferably used in a door mirror device.

2. Description of Related Art

Conventionally, there is known a lighting device for vehicle provided on a housing body which constitutes a part of a door mirror device as an outer mirror. In the lighting device, a plurality of light-emitting diodes (LED) as light emitting devices are provided on an outer end portion of the housing body in a width direction of a vehicle (vehicle width direction) and disposed with intervals in a horizontal direction. The lighting device for vehicle is used as a signal lamp to let following cars or the like to perceive right turn or left turn by simultaneously turning ON the plurality of light-emitting diodes (refer to Japanese Patent Laid-open No. 2002-79885, for example).

Further, vehicle regulations provide that the plurality of light-emitting diodes should be recognized as one light source when they are turned ON.

Furthermore, it is known that there is also a lighting device for vehicle where a plurality of light-emitting diodes are provided in a row with intervals in a horizontal direction from the outer end portion toward the inner end portion of the housing body in the vehicle width direction. In the above lighting device for vehicle, a plurality of light-emitting diodes provided on the outer end portion in the vehicle width direction are used as signal lamps and light-emitting diodes provided on the inner end portion in the vehicle width direction are used as ornament lamps.

For the lighting device for vehicle as well, regulations provide that the plurality of light-emitting diodes arranged in a row should be recognized as one light source when they are turned ON.

Furthermore, as the lighting device for vehicle, a lighting device for vehicle configured such that an outer lens is provided for the housing body and the inside of the lighting device for vehicle is seen through the outer lens is also known.

Incidentally, in this type of the lighting device for vehicle where the inside is seen from outside, since the inside of the lighting device for vehicle is seen through the outer lens even when the light-emitting diodes are not turned ON, there is an inconvenience that a decorating characteristic reduces.

Thus, an idea that a reflector reflecting output light from the light-emitting diodes and leading to the outer lens is provided between the housing body and the outer lens and the reflector is allowed to function as a decorating wall.

However, in the regulations, when the plurality of light-emitting diodes are simultaneously turned ON, a positional relation between the light-emitting diode and the reflector is specified such that irradiated regions formed on the inside surface of the outer lens by the output light reflected by the reflector become adjacent to each other with intervals, each of which is set to a predetermined interval or less.

This is because, according to the legal standard of Europe, only a single lighting device is admitted to be mounted on the door mirror device, and if a plurality of light-emitting diodes are used as a light source in the lighting device, the adjacent irradiated regions should have intervals, each of which is a predetermined gap or less.

On the other hand, legal standard of a light distribution angle range for a side turn lamp is different by each area. For example, in European region, the angle range is from approximately 5 degrees to approximately 60 degrees in relation to a front-rear direction of a vehicle as a reference direction. On the contrary, in North American region, the angle range is set from approximately 30 degrees to approximately 70 degrees. This is because an angle formed by light beam on a rear end side of irradiated light which is irradiated outwardly from the lighting device and the vehicle front-rear direction is required to be an angle of a predetermined angle or less, that is, 5 degrees or less in Europe and 30 degrees or less in the U.S.

In the case of the lighting device for vehicle having the reflector which reflects output light from the light-emitting diodes and leads to the outer lens, if the reflector is allowed to function as the decorating wall, the shape of the reflector needs to be devised depending on each area because the legal standard is different depending on each area. For this reason, the lighting device for vehicle having the reflector has an inconvenience that the degree of freedom in design is poor and lacks flexibility in design.

Furthermore, in this type of lighting device for vehicle in which the inside is seen through the outer lens also has an inconvenience that a decorating characteristic reduces since the light-emitting diodes are seen from outside through the outer lens.

SUMMARY OF THE INVENTION

An object of the present invention is to provide a lighting device which is capable of flexibly being adjusted to regulations of each area having a different range of a light distribution angle and capable of improving a decorating function by making light-emitting diodes become difficult to visually contact from outside, and a door mirror device using the lighting device.

To achieve the above object, a lighting device according to an embodiment of the present invention includes a housing body, an outer member provided on the housing body, a decorating wall provided between the housing body and the outer member and a plurality of light emitting devices which are provided between the housing body and the decorating wall and disposed with intervals to each other. The decorating wall includes a plurality of light transmitting portions, each of which is disposed to face each of the plurality of light emitting devices. The light transmitting portion is disposed to set light emitted from the corresponding light emitting device within a range of a predetermined light distribution angle.

BRIEF DESCRIPTION OF THE DRAWINGS

FIG. 2A is an explanatory view of Example 1 of a lighting device for vehicle according to the present invention, in which a range of a light distribution angle is set from 30 degrees to 70 degrees.

FIG. 2B is an explanatory view of Example 1 of a lighting device for vehicle according to the present invention, in which a range of a light distribution angle is set from 5 degrees to 55 degrees.

FIG. 5A is an explanatory view showing another example of a lighting device for vehicle according to the present invention, in which a range of a light distribution angle is set from 30 degrees to 70 degrees.

FIG. 5B is a sectional view for illustrating a lighting device for vehicle in which a range of a light distribution angle is set from 5 degrees to 55 degrees.

DETAILED DESCRIPTION OF THE PREFERRED EMBODIMENTS

Descriptions will be made for examples of a lighting device for vehicle according to the present invention with reference to the drawings as follows.

A lighting device according to an embodiment of the present invention includes a housing body, an outer member such as an outer lens provided on the housing body, a decorating wall provided between the housing body and the outer lens and a plurality of light emitting devices which are provided between the housing body and the decorating wall and disposed with intervals to each other. The decorating wall includes a plurality of light transmitting portions, each of which is disposed to face each of the plurality of light emitting devices. The light transmitting portion is disposed to set light emitted from the corresponding light emitting device within a range of a predetermined light distribution angle.

The light transmitting portion may be provided separately from or integrated with the decorating wall. The light transmission portion may be a flat plane, an opening, a prism, a convex lens, or the like. In the case of the opening, a prism may be disposed in the opening. The prism, the convex lens, or the like may be configured to change the range of the light distribution angle. A positioning peripheral wall which positions a mask member on the light transmitting portion may be formed on a circumference of each of the light transmitting portions.

EXAMPLE 1

Figure 1:
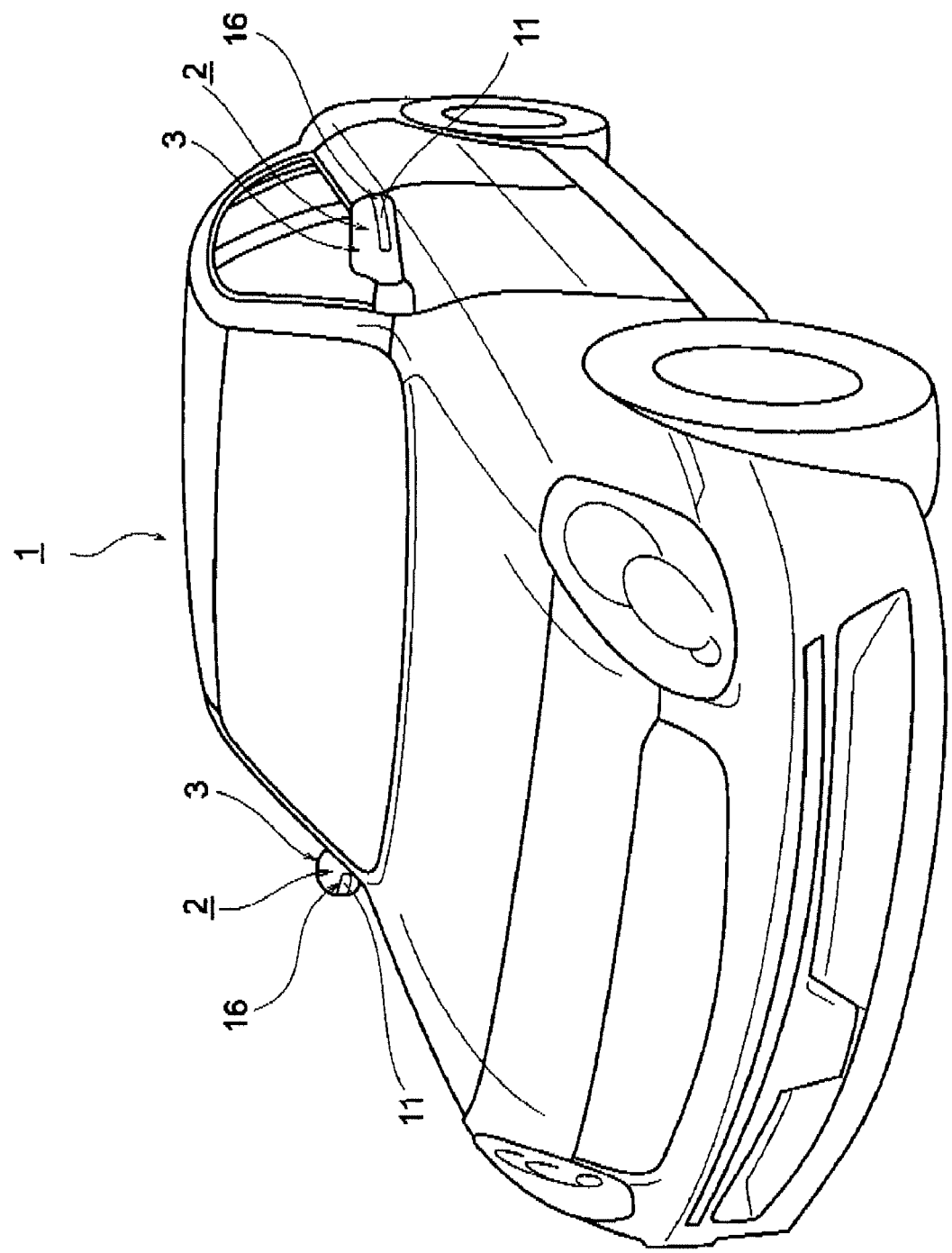
FIG. 1 is a perspective view for describing a vehicle having door mirrors provided with a lighting device for vehicle according to an embodiment of the present invention.

A lighting device according to an embodiment of the present invention may be used in a door mirror device (door mirror) as an outer mirror. FIG. 1 is the perspective view showing a state where door mirror devices as outer mirrors for vehicle, each of which is provided with a lighting device for vehicle according to an embodiment of the present inventions are erected to a vehicle body.

In FIG. 1, reference numeral 1 denotes a vehicle body, and 2 denotes a door mirror as an outer mirror for vehicle. The door mirror 2 has a lighting device including a housing body 3 which is configured to hold the door mirror 2 for rear viewing as shown in FIG. 2 in an enlarged manner. The door mirror 2 is designed to be turnable between an erected state and a retracted state to the vehicle body 1.

The housing body 3 has a shape curved backwardly (arrow A direction) from an inner end portion toward an outer end portion in a width direction of the vehicle body 1 at a rear surface side of the mirror 4 in an erected state.

A base member 5 is provided inside the housing body 3. Positioning members 6 are provided with appropriate intervals on the base member 5 from the outer end portion toward the inner end portion in the width direction of the vehicle body 1. A circuit board 7 is provided on the positioning member 6. The circuit board 7 is positioned by the positioning member 6 and fixed on the base member 5 by a presser bar spring 8 and a locking screw 9. Light-emitting diodes (LED) 10 as light emitting devices are provided for the circuit board 7. The light-emitting diodes 10 are arrayed from the outer end portion toward the inner end portion in the width direction of the vehicle body 1.

An outer lens 11 as an outer member exposed on the rear surface side of the housing body 3 is provided on the base member 5. A decorating wall 12 is provided between the base member 5 and the outer lens 11. The decorating wall 12 is formed by resin molding, for example.

Each of the light-emitting diodes 10 is arranged between the base member 5 and the decorating wall 12. A light transmitting portion 13 is formed on an area of the decorating wall 12 so as to face a light emission portion 10a of the light emitting diode 10.

Figure 3:
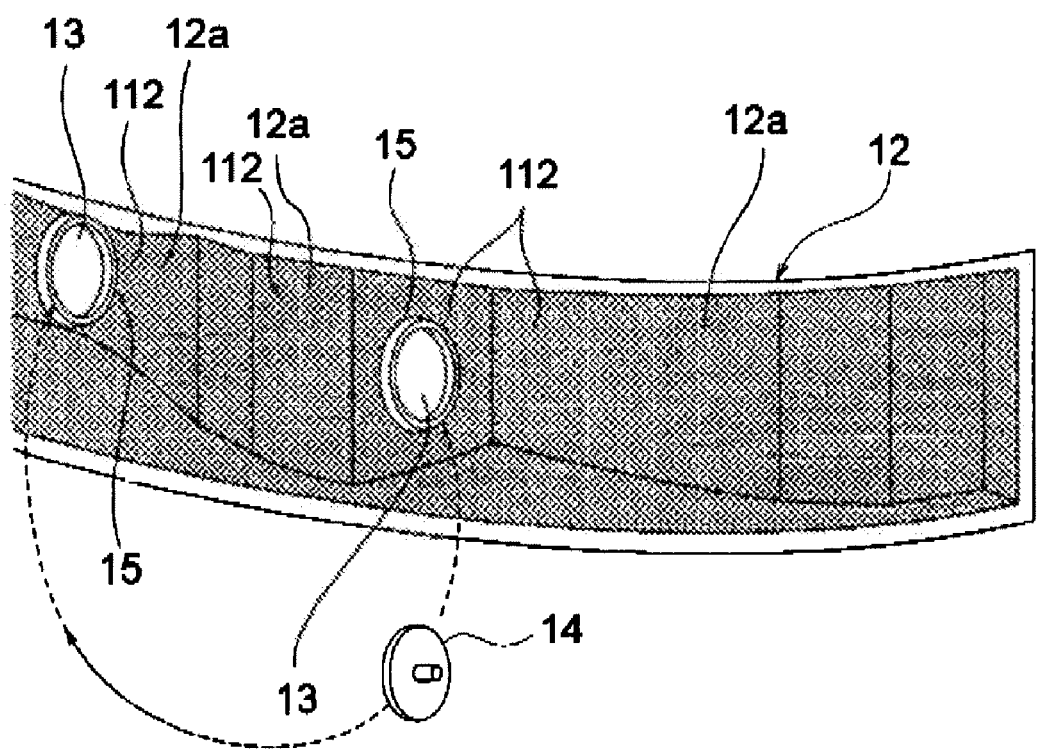
FIG. 3 is a partially perspective view showing an external shape of a decorating wall according to an embodiment of the present invention.

On the decorating wall 12, as shown in FIG. 3, positioning peripheral walls 15, for example in a cylindrical shape, which position mask members 14 to prevent attachment of deposited matter on the light transmitting portions 13 when performing deposition are formed so as to surround the light transmitting portion 13 corresponding to the outer end portion in the width direction of the vehicle body 1 and residual light transmitting portions 13.

A deposited surface is provided on at least one surface of the decorating wall excluding areas of the light transmitting portions. The deposited surface may be provided on a surface of the decorating wall, which faces the housing body or the outer lens, as well as provided on both surfaces.

The deposited surface 12a which carries out decorating action when visually contacted from outside through the lens is formed on the surface facing the outer lens 11 and excluding areas of the light transmitting portions 13.

Each light-emitting diode 10 is configured to output direct light P1, P2, P3 (see FIG. 4) through the light transmitting portions 13 and the outer lens 11 in an angle range directing backward from the width direction of the vehicle body 1 so as to be visually contacted as one light source when simultaneously turned ON in the erected state of the housing body 3. Herein, a part of direct light P1 and direct light P2 is used as light for turn signal.

The decorating wall has a plurality of wall sections 112 on each of which the light transmitting portion is provided. The wall sections 112 have different inclinations from each other and are disposed to set light from the light emitting devices within the range of the predetermined light distribution angle. The decorating wall 12 is configured to have different structures of the light transmitting portion 13 depending on regions. The decorating wall 12 is manufactured via a manufacturing process described below, for example.

For example, in a case where a range of a light distribution angle provided in the regulations is from approximately 30 degrees to approximately 70 degrees in relation to the front-rear direction of a vehicle as a reference direction Z, a mold die is provided on a mold cavity (not shown) such that a transparent flat plate corresponding to the light transmitting portions 13 is obtained. Thus, a molded component having a shape corresponding to the decorating wall 12 is formed.

Next, the transparent flat plate of the molded component is masked by the mask members 14 shown in FIG. 3. Then, aluminization is applied to at least one surface of the molded component excluding the masked areas of the transparent flat plate by using a deposition apparatus (not shown) to form the deposited surface 12a.

Then, the mask members 14 are removed from the molded component. Consequently, the decorating wall 12 where the light transmitting portions 13 are made of transparent flat plate and which has the deposited surface 12a is formed.

When a lighting device for vehicle 16 is manufactured by using the decorating wall 12, the lighting device for vehicle 16 corresponding to the region where the range of the light distribution angle is set from approximately 30 degrees to approximately 70 degrees in relation to the front-rear direction of the vehicle body 1 as a reference direction Z is obtained as shown in FIG. 2A.

Furthermore, for example, in a case where the range of the light distribution angle provided in the regulations is set from approximately 5 degrees to approximately 55 degrees in relation to the front-rear direction of the vehicle as a reference direction Z, a mold die to form a prism surface (not shown) is provided on the cavity of mold such that the prism surface is obtained in areas corresponding to the light transmitting portions 13 as light distribution windows. Consequently, a molded component having the shape corresponding to the decorating wall 12 is formed.

Next, the prism surface of the molded component is masked by the mask members 14. Next, aluminization is applied to on the surface of the molded component excluding areas of the prism surface by using the deposition apparatus (not shown) to form the deposited surface 12a.

Next, mask members 14 are removed from the molded component. Consequently, the decorating wall 12 where the light transmitting portions 13 are made of the prism surface and which has the deposited surface 12a is formed.

When the lighting device for vehicle 16 is manufactured by using the decorating wall 12, the lighting device for vehicle 16 corresponding to the region where the range of the light distribution angle is set from approximately 5 degrees to approximately 55 degrees in relation to the front-rear direction of the vehicle as a reference direction Z is obtained as shown in FIG. 2B.

According to an example of the invention, by a slight change in a molding process which is replacing a mold die, the lighting device for vehicle 16 capable of flexibly being adjusted to regulations of each area having a different range of the distribution angle can be inexpensively manufactured. Furthermore, since the light-emitting diode 10 cannot be visually contacted directly via the outer lens 11, a decorating function can be improved by making light-emitting diodes become difficult to visually contact from outside.

EXAMPLE 2

In the above Example 1, the configuration for manufacturing the lighting device for vehicle 16 capable of flexibly being adjusted to regulations of each area having a different range of the light distribution angle by forming the transparent flat plate or the prism surface on the light transmitting portions 13 of the decorating wall 12, is employed. The lighting device for vehicle is also capable of improving the decorating function by making light-emitting diodes become difficult to visually contact from outside. However, a configuration having the shape described below can be also employed as the decorating wall.

Figure 4A:
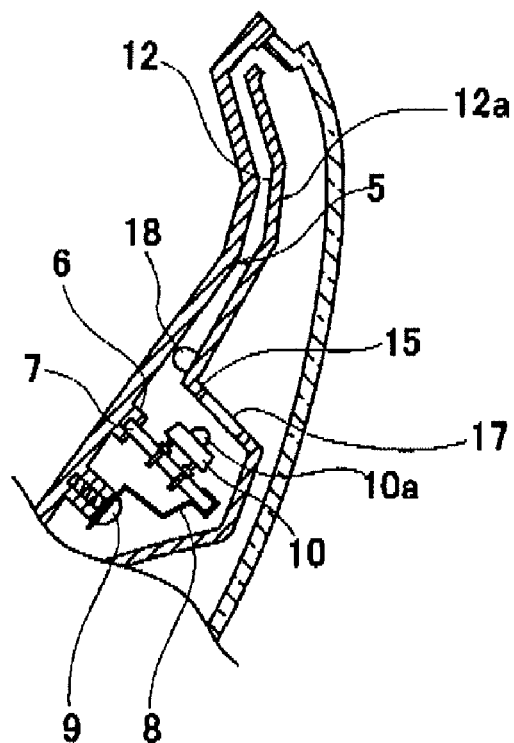
FIG. 4A is a partially enlarged sectional view of a lighting device for vehicle for illustrating Example 2 of a lighting device for vehicle according to the present invention, in which a light transmitting portion includes an opening.

Herein, the decorating wall 12 has openings 17 as the light transmitting portions 13 and positioning protrusions 18 as shown in FIG. 4A. A mold die to form the openings 17 (not shown) and a mold die to form the positioning protrusions 18 (not shown) are provided on a cavity to form the decorating wall 12. Consequently, the molded component of the decorating wall 12 is formed. Next, aluminization is applied to the surface of the decorating wall 12 excluding areas of the openings 17 by using the deposition apparatus (not shown) to form the deposited surface 12a. Consequently, the decorating wall 12 having the openings 17 and the positioning protrusions 18 is manufactured.

Since the configuration of the base member 5, the configuration of the outer lens 11 and the residual configuration of the decorating wall 12 are similar to the configuration shown in FIG. 2, their detailed description will be omitted.

Then, in a case where the range of the light distribution angle provided in the regulations is set from approximately 30 degrees to approximately 70 degrees in relation to the front-rear direction of the vehicle as a reference direction Z (see FIG. 5A), the openings 17 themselves are used as the light transmitting portions 13. Furthermore, a specific prism body may be fixed to the openings 17.

Figure 4B:
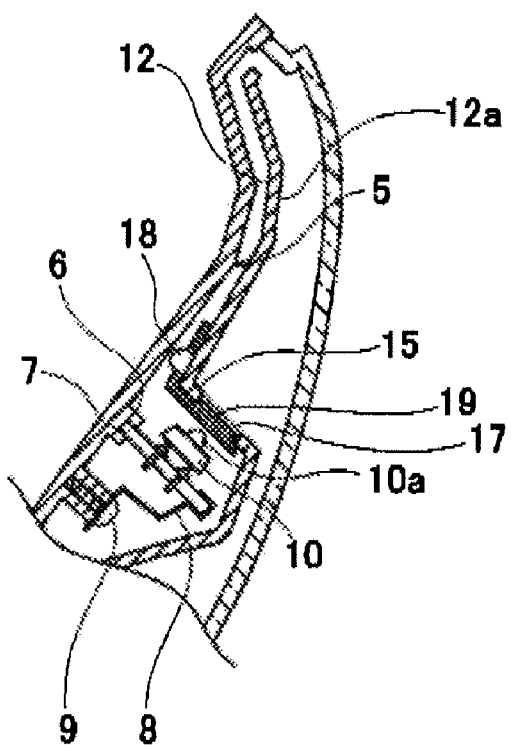
FIG. 4B is a partially enlarged sectional view of a lighting device for vehicle in which a prism is disposed on the opening of the decorating wall shown in FIG. 4A.
Figure 4C:
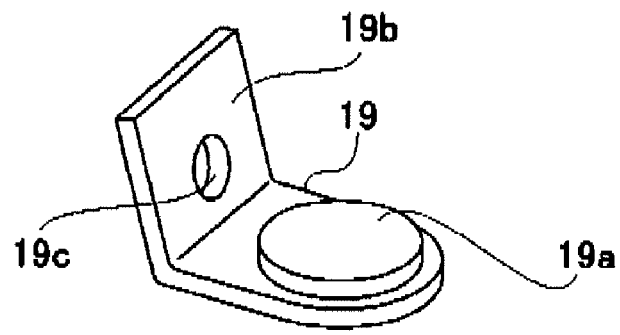
FIG. 4C is a perspective view of the prism shown in FIG. 4B.

Furthermore, in a case where the range of the light distribution angle provided in the regulations is set from approximately 5 degrees to approximately 55 degrees in relation to the front-rear direction of the vehicle as a reference direction Z (see FIG. 5B), a prism body 19 which deflects light beam shown in FIG. 4C is previously prepared by molding.

The prism body 19 has a prism portion 19a and an attaching portion 10b. An attaching hole 19c to be fitted into the protrusion 18 is formed on the attaching portion 19b. Then, in a case of manufacturing the lighting device for vehicle in which the range of the light distribution angle provided in the regulations is set from approximately 5 degrees to approximately 55 degrees in relation to the front-rear direction of the vehicle as a reference direction Z, the prism portion 19a of the prism body 19 is fitted with the opening 17 and the protrusion 18 is fitted with the attaching hole 19c, and the prism body 19 is fixed to the decorating wall 12 as shown in FIG. 4B.

With the above configurations, in a case where the range of the light distribution angle provided in the regulations is set from approximately 5 degrees to approximately 55 degrees in relation to the front-rear direction of the vehicle as a reference direction Z, light beam outputted at the angle range from approximately 30 degrees to approximately 70 degrees can be deflected by the prism body 19 as shown in FIG. 5B.

According to an example of the invention, in a case of manufacturing the lighting device for vehicle 16 corresponding to regulations having a different range of the light distribution angle depending on each area, the same mold can be used as a mode to be used in molding the decorating wall 12.

When the prism body 19 is installed to the opening 17 of the decorating wall 12, which is molded in the above-described manner, the range of the light distribution angle of the lighting device for vehicle 16 can be varied. Furthermore, even in a case where the regulations are changed, simply preparing the prism body 19 having a different refraction angle can adjust to the change. Therefore, the invention can flexibly be adjusted to the changes of regulations.

Specifically, by the slight change of a process which is attaching and detaching or replacing of the prism body 19, it becomes possible to inexpensively manufacture the lighting device 16 capable of flexibly being adjusted to regulations of each area having a different range of the light distribution angle and capable of improving a decorating function by making the light-emitting diodes 10 become difficult to visually contact from outside.

The configuration where the prism body is fixed to the opening 17 can be applied for the regulations of North America, and according to Example 2, the degree of freedom of the light distribution settings remarkably increases.

Although the present invention has been described in terms of exemplary embodiments, it is not limited thereto. It should be appreciated that variations may be made in the embodiments described by persons skilled in the art without departing from the scope of the present invention as defined by the following claims.

According to the present invention, an effect being capable of flexibly being adjusted to regulations of each area having a different range of a light distribution angle and making light-emitting diodes become difficult to visually contact from outside to improve the decorating function is exerted.

What is claimed is:

1. A door mirror device for a vehicle, which is disposed at both end portions of the vehicle in a width direction of the vehicle, comprising: a housing body, a mirror which is held by the housing body, and a lighting device, the lighting device having:
    a base member provided in the housing body;
    an outer lens provided on the base member:
    a decorating wall provided between the base member and the outer lens;
    a plurality of light emitting devices; and
    a plurality of circuit boards on each of which at least one light emitting device of the plurality of light emitting devices is provided,
    wherein a plurality of positioning members are disposed on the base member with intervals to each other in the width direction;
    wherein one end of each of the plurality of circuit boards is fixed on a respective of the plurality of positioning members disposed with intervals to each other;
    wherein the decorating wall includes a plurality of light transmitting portions, each of which is disposed to face a respective of the plurality of light emitting devices; and
    wherein each light transmitting portion is disposed to set light emitted from the corresponding light emitting device so as to be visually contacted as one light source within a range of a predetermined light distribution angle directing backward from the width direction in an erected state of the housing body.

2. The door mirror device according to claim 1, wherein each of the light transmitting portions of the decorating wall includes an opening.

3. The door mirror device according to claim 2, wherein a prism is disposed in the opening to change the range of the light distribution angle.

4. The door mirror device according to claim 3, wherein a prism is detachably disposed in the opening.

5. The door mirror device according to claim 2, wherein a positioning peripheral wall which positions a respective mask member on each of the light transmitting portions is formed on a circumference of each of the light transmitting portions.

6. The door mirror device according to claim 1, wherein each of the light transmitting portions of the decorating wall includes a prism integrated with the decorating wall and disposed to change the range of the light distribution angle.

7. The door mirror device according to claim 6, wherein a positioning peripheral wall which positions a respective mask member on each of the light transmitting portions is formed on a circumference of each of the light transmitting portions.

8. The door mirror device according to claim 1, wherein each of the light transmitting portions of the decorating wall includes a convex lens disposed to change the range of the light distribution angle.

9. The door mirror device according to claim 8, wherein a positioning peripheral wall which positions a respective mask member on each of the light transmitting portions is formed on a circumference of each of the light transmitting portions.

10. The door mirror device according to claim 1,
    wherein the range of the predetermined light distribution angle is from 5 degrees to 55 degrees in relation to a front-rear direction of the vehicle.

11. The door mirror device according to claim 1,
    wherein the range of the predetermined light distribution angle is from 30 degrees to 70 degrees in relation to a front-rear direction of the vehicle.

12. The door mirror device according to claim 1, where the decorating wall includes a deposited surface provided on at least one surface of the decorating wall excluding area of the light transmitting portions.

13. The door mirror device according to claim 1, wherein a deposited surface is provided on a surface of the decorating wall, which faces the outer lens.

14. The door mirror device according to claim 1, wherein a deposited surface is provided on a surface of the decorating wall, which faces the housing body.

15. The door mirror device according to claim 1
    wherein the decorating wall has a plurality of wall sections which have different inclinations from each other, and
    wherein each of one or more wall sections of the plurality of wall sections is disposed so as to face a respective of the plurality of circuit boards.

16. The door mirror device according to claim 15, wherein the plurality of light transmitting portions are disposed on the one or more wall sections of the plurality of wall sections, which are disposed so as to face the plurality of circuit boards.

17. The door mirror device according to claim 1, wherein the outer lens is disposed at a rear surface side of the mirror in an erected state of the housing body and has a shape curved backwardly from an inner end portion toward an outer end portion in the width direction of the vehicle.

* * * * *